United States Patent [19]

Lathrop et al.

[11] Patent Number: 5,633,734
[45] Date of Patent: May 27, 1997

[54] METHOD AND APPARATUS FOR MODIFYING A FLUORESCENT PORTION OF A DIGITAL IMAGE

[75] Inventors: George E. Lathrop, Dansville; Todd A. Jackson, Pittsford, both of N.Y.

[73] Assignee: Eastman Kodak Company, Rochester, N.Y.

[21] Appl. No.: 635,092

[22] Filed: Apr. 17, 1996

Related U.S. Application Data

[60] Provisional application No. 60/002,532 Aug. 18, 1995.
[51] Int. Cl.$^6$ .................. H04N 1/56; H04N 1/62
[52] U.S. Cl. ................. 358/530; 358/537; 358/538; 395/109; 395/131
[58] Field of Search .................. 358/537, 538, 358/530, 518, 521; 395/109, 131, 790; 382/167

[56] References Cited

U.S. PATENT DOCUMENTS

| | | | |
|---|---|---|---|
| 5,003,326 | 3/1991 | Suzuki et al. | 358/521 |
| 5,189,511 | 2/1993 | Parulski et al. | 358/518 |
| 5,469,536 | 11/1995 | Blank | 395/131 |
| 5,506,946 | 4/1996 | Bar et al. | 395/131 |

*Primary Examiner*—Scott A. Rogers
*Attorney, Agent, or Firm*—Peyton C. Watkins

[57] ABSTRACT

A program storage device is readable by a machine, which tangibly embodies a program of instructions executable by the machine to perform method steps for modifying color of an image captured in a digitized, color form. The method comprises the steps of sequentially modifying each portion of the image by a color matrix; determining when a portion of the modified image contains a predetermined fluorescent level; and further modifying only the portion of the image containing the predetermined fluorescent level by varying a fluorescent modification factor until a desired fluorescent level is obtained.

5 Claims, 2 Drawing Sheets

METHOD AND APPARATUS FOR MODIFYING A FLUORESCENT PORTION OF A DIGITAL IMAGE

CROSS REFERENCE TO RELATED APPLICATION

Reference is made to and priority claimed from U.S. Provisional application Ser. No. 60/002,532, filed 18 Aug. 1995, entitled A METHOD AND APPARATUS FOR MODIFYING A FLUORESCENT PORTION OF A DIGITAL IMAGE.

FIELD OF THE INVENTION

The invention relates generally to the field of capturing a color digitized image, and, thereafter, enhancing its color and, more particularly, to such an enhanced image in which only fluorescent portions are further modified for more accurately reproducing its fluorescent portions.

BACKGROUND OF THE INVENTION

An image sensor typically includes a sensor package for forming an enclosure or housing of the image sensor. The sensor package usually includes a solid bottom portion for forming the foundation and a transparent coverglass resting atop the bottom portion for sealingly enclosing the sensor package. An image sensor chip is positioned in the interior of the sensor package and, more specifically, atop the bottom portion, and functions to receive light for forming electronic representations of an image thereon. The coverglass permits light to pass inside the sensor package for providing a passageway for incident light to pass to the sensor chip.

The top surface of each image sensor chip is divided into an array of picture elements, generally referred to in the art as pixels, that are positioned contiguous to each other. Each pixel functions to form one discrete element of the electronic representation of the image which, when assembled together in the array, forms the total electronic image representation. The image sensor operates by converting optical energy it receives into separate charge packets at each pixel. The amount of charge that is produced is dependent upon the light level and time of exposure. Any well-known color filter array, such as a Bayer array, may be placed atop the sensor chip and inside the coverglass for permitting the charge packets to discern between different colors for forming a color electronic representation of the image (i.e., color filter array image). The charge packets, whose values range from 0 to 255, are then read out from each pixel and stored to a storage medium, for example a personal computer card, (i.e., PC card) for later retrieval.

To display the stored image from the PC card to a display device, such as for example a typical cathode ray tube screen (CRT), the color filter array image is further processed to a format which is more suitable for display. In this regard, the PC card is typically placed in a personal computer for interpolating the colored filter array image into a standard color space, such as a red, green and blue (RGB) image. The RGB image is enhanced by a color correction matrix, such as the color correction matrix disclosed in U.S. Pat. No. 5,189,511 which is herein incorporated by reference, over the entire RGB image for enhancing its color according to the predetermined display device. The image is then passed to and displayed on the CRT.

Although the presently known and utilized method and apparatus for enhancing digitized images are satisfactory, they are not without drawbacks. The enhanced image may include false fluorescent color within the fluorescence portions of the image. This false color results from the fact that fluorescent portions of the image may contain at least one color component which is beyond its maximum value, for example 255 in an eight bit system. This results in this color component value being given a value of 255 which produces a false color.

Consequently, a need exists for a method and apparatus for enhancing images which reduce the false color of fluorescent portions as produced from the conventional enhancing process.

SUMMARY OF THE INVENTION

The present invention is directed to overcoming one or more of the problems set forth above. Briefly summarized, one aspect of the present invention resides in a program storage device readable by a machine, tangibly embodying a program of instructions executable by the machine to perform method steps for modifying color of an image captured in a digitized, color form, the method comprising the steps of (a) sequentially modifying each portion of the image by a color matrix; (b) determining when a portion of the modified image contains a predetermined fluorescence level resulting from the modification; and (c) further modifying only the portion of the image containing the predetermined fluorescence level by varying a fluorescence modification factor until a desired fluorescence level is obtained.

It is an object of the present invention to provide a RGB image which reduces the fluorescent noise produced from the enhancing process of the image.

It is a feature of the present invention to modify only that portion of the RGB image which includes fluorescence.

It is an advantage of the present invention to provide a method which is efficiently computed by standard computer hardware.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
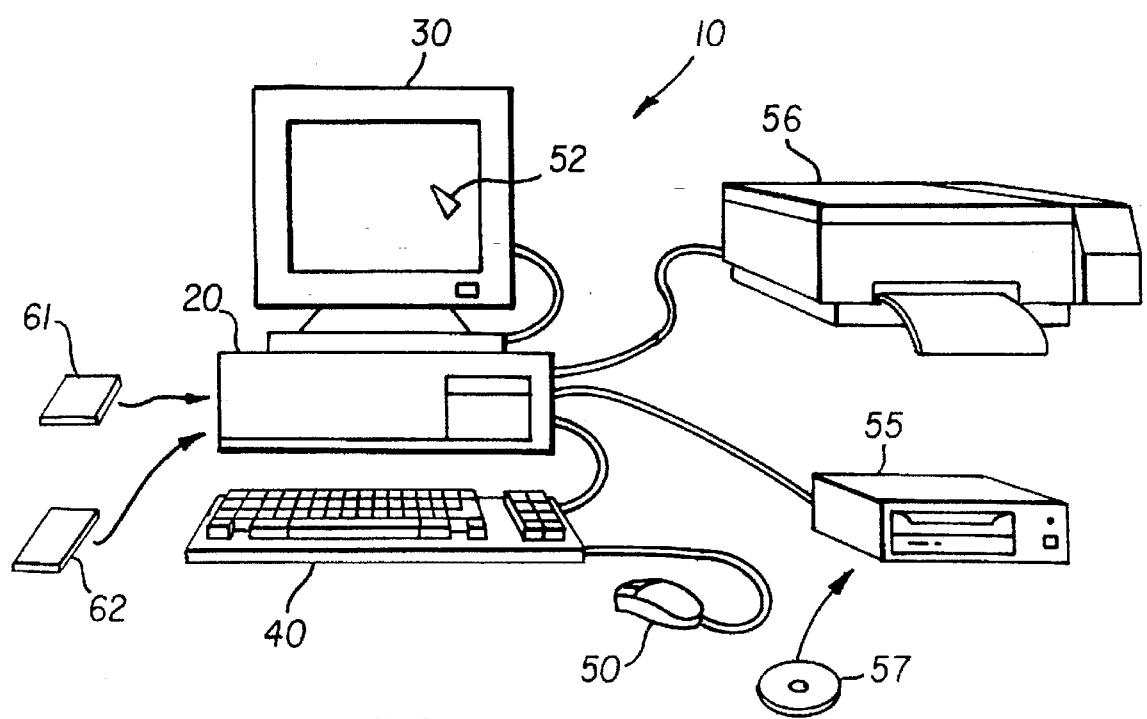
FIG. 1 is a schematic diagram of a typical computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor based unit 20 for receiving and processing software programs and for performing other processing functions. A display 30 is electrically connected to the microprocessor based unit 20 for displaying user related information associated with the software. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57, which typically includes a software program. In addition, a floppy disk 61 may also include a software program, and is inserted into the microprocessor based unit 20 for inputting the software program. Still further, the microprocessor based unit 20 may be programmed, as is well known in the art, for storing the software program internally. A printer 56 is connected to the microprocessor based unit 20 for printing a hardcopy of the output of the computer system 10.

Images may also be displayed on the display 30 via a personal computer card (PC card) 62 or, as it was formerly known, a personal computer memory card international association card (PCMCIA card) which contains digitized images electronically embodied in the card 62. The PC card 62 is ultimately inserted into the microprocessor based unit 20 for permitting visual display of the image on the display 30. Before proceeding further, it is first instructive to have a basic understanding of the process by which digitized images are typically formed.

Figure 2:
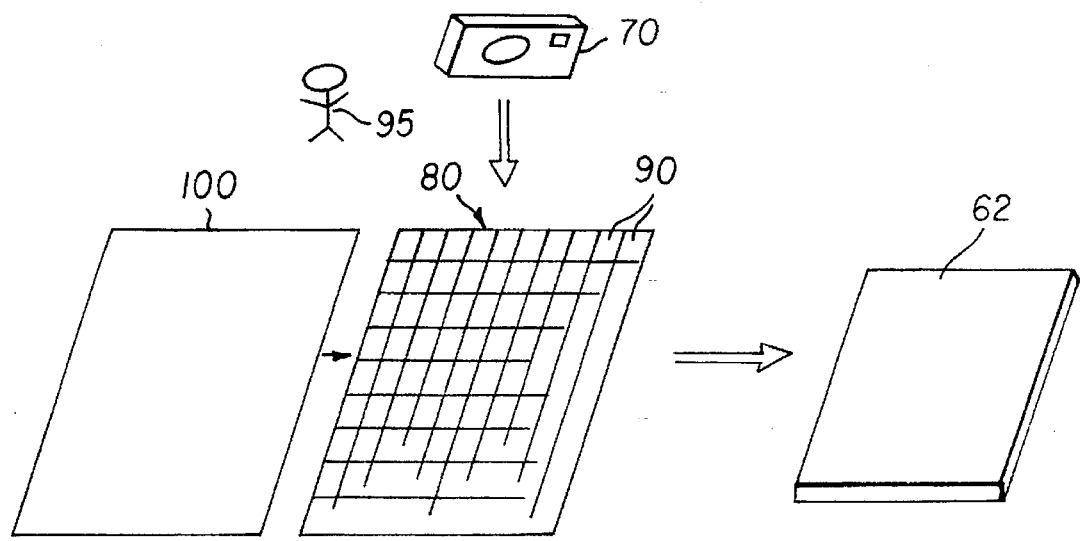
FIG. 2 is schematic diagram illustrating the process of capturing an image.

In this regard, and referring to FIG. 2, a camera 70 includes a charge-coupled device (CCD) 80 having a plurality of pixels 90 for capturing the optical incident image 95. Any color filter array 100, such as a Bayer array, is placed over the CCD 80 for permitting a color representation of the image 95 (colored filter array image or CFA image) to be captured by the pixels 90, as is well known in the art. The pixels 90 convert the incident optical energy into a plurality of values, typically ranging from 0–255. The image 95 is then stored electronically on the PC card 62 for permitting later retrieval by well-known computer devices.

Figure 3:
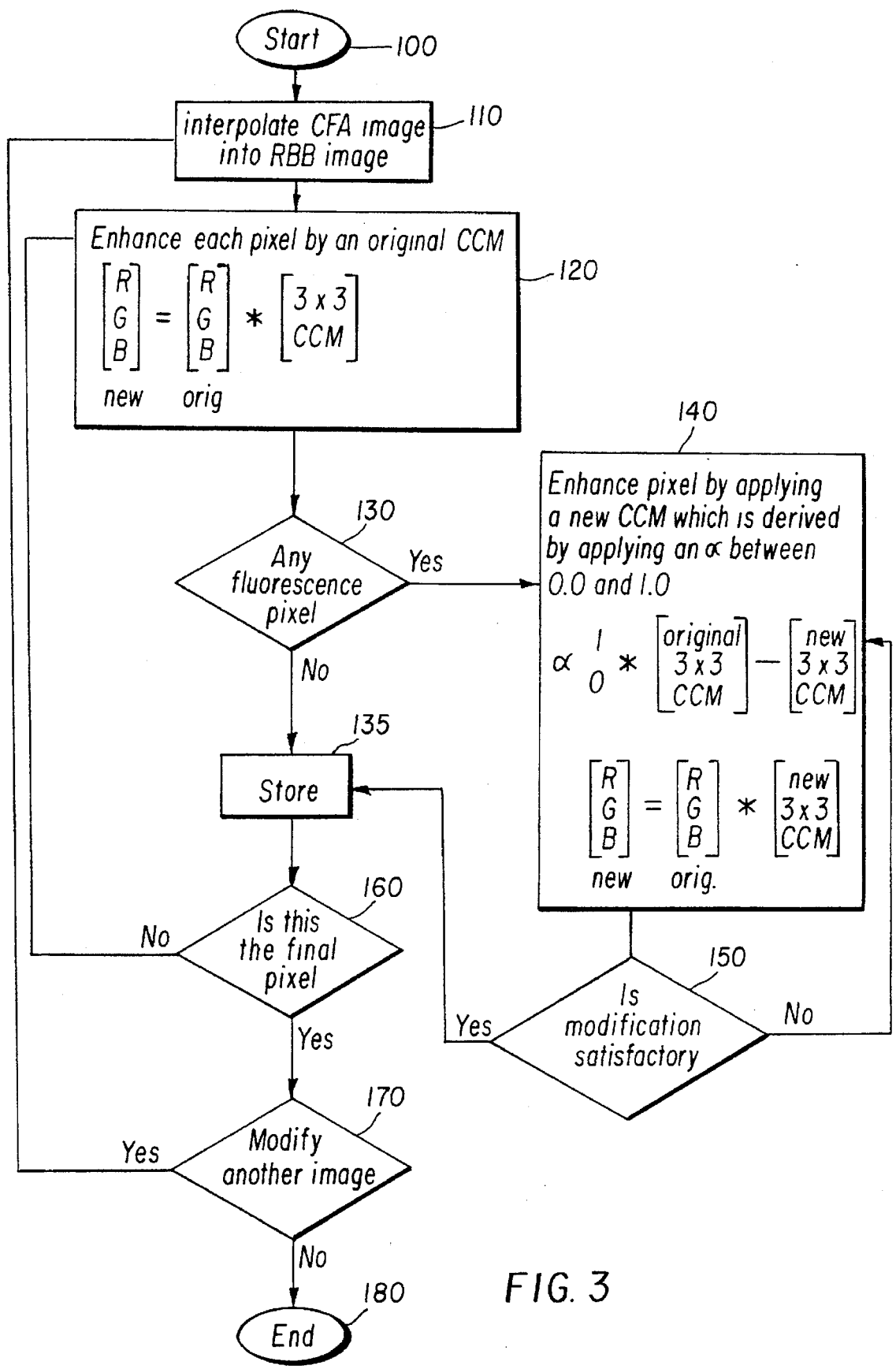
FIG. 3 is a flowchart illustrating a software program for performing the present invention.

Referring to FIG. 3, a flowchart of the present invention is illustrated. It is instructive to note that the flowchart illustrates a preferred embodiment of a software program contained on the floppy disk 61, compact disk 57 or programmed into the microprocessor based unit 20, and is implemented by the computer system 10. In addition, the CFA image referred to in the flowchart is contained on the PC card 62 and is also implemented by the computer system 10. Furthermore, the flowchart illustrates the process performed on all pixels forming the captured image.

Referring specifically to the flowchart, the program is initiated 100 for use by the user via the mouse 50 or keyboard 40. The CFA image contained on the PC card 62 is interpolated 110 into a standard color space, such as a red, green and blue color space (RGB), by techniques well-known in the art. The RGB image is then sequentially enhanced (pixel by pixel) by any well-known color correction matrix 120, such as that disclosed in U.S. Pat. No. 5,189,511, over the entire image for modifying the color representation of the image. If any pixel contains either one color component at its maximum value, 255, and two color components at its low value (preferably between zero and 15) or one color components at its maximum value, one substantially at its maximum (240–255), and one color component at its low value, this indicates a fluorescence portion of the image 130 which initiates a subroutine for modifying the fluorescent portion. All pixels, other than the fluorescent pixels, are stored 135 to the PC card 62 for later retrieval.

In regard to the fluorescent pixels, the RGB components representing each fluorescent pixel are re-iteratively multiplied 140 by a new color correction matrix derived by applying an $\alpha$ factor (preferably between zero and one) to the original color correction matrix, which $\alpha$ is either incrementally decreased or increased on each re-iteration for continuously modifying each color component value of the pixel until all color components for each color component of the pixel are below 255 as shown in 150. It is instructive to note that the direction of modification (incrementally increasing or decreasing) is arbitrary, and depends upon the particular user. Preferably, the color components of the modified, fluorescent pixel will have a maximum final color value of, for example a RGB image, between 240 and 254, although other values could be used depending upon the desired modification as those skilled in the art will be able to determine. Once this fluorescence pixel is modified, it is also stored 135 to the PC card 62 for later retrieval.

The program continues the above-described color correction modification until all the pixels have been modified 160. Once the entire image is modified, the user may select to modify another image 170 at which point the next image is interpolated 110 and the process is executed on this image. If there aren't any further images to be modified the program is exited 180.

Referring briefly back to FIG. 1, the electronic representation of the image may then be displayed, via the PC card inserted into the microprocessor based unit, to the display 30 or printed on a printer 56.

The invention has been described with reference to a preferred embodiment. However, it will be appreciated that variations and modifications can be effected by a person of ordinary skill in the art without departing from the scope of the invention.

Parts List:
10 computer system
20 microprocessor based unit
30 display
40 keyboard
50 mouse
52 selector
55 memory
56 printer
57 compact disk
61 floppy disk
62 PC card
70 camera
80 charge-coupled device
90 pixels
95 optical incident image
100 color filter array
100 start
110 interpolate CFA image into RGB image
120 color correction matrix
130 fluorescence pixel
135 store
140 modification factor
150 modification satisfactory
155 color correction matrix
160 modified color correction
170 modify image
180 end

We claim:

1. A program storage device readable by a machine, tangibly embodying a program of instructions executable by the machine to perform method steps for modifying color of an image captured in a digitized, color form, the method comprising the steps of:

(a) sequentially modifying each portion of the image by a color matrix;

(b) determining when a portion of the modified image contains a predetermined fluorescent level; and (c) further modifying only the portion of the image containing the predetermined fluorescent level by varying a fluorescent modification factor until a desired fluorescent level is obtained.

2. The device as in claim 1 wherein the modification factor includes a varying multiplier applied to a color correction matrix for obtaining a modified color correction matrix which is applied to the fluorescent portion.

3. The device as in claim 2 wherein further including varying the multiplication factor between zero and one for modifying the fluorescent level.

4. The device as in claim 3 wherein the predetermined fluorescent level includes determining when one component of a color space substantially reaches it maximum value.

5. An article of manufacture comprising:

a computer usable medium having computer readable program code means embodied therein for causing an image captured in a digitized, color form to be modified, the computer readable program code means in the article of manufacture comprising:

(a) computer readable program code means for causing a computer to effect sequentially modifying each portion of the image by a color matrix;

(b) computer readable program code means for causing a computer to effect determining when a portion of the modified image contains a predetermined fluorescent level; and (c) computer readable program code means for causing a computer to effect further modifying only the portion of the image containing the predetermined fluorescent level by varying a fluorescent modification factor until a desired fluorescent level is obtained.

* * * * *